(12) United States Patent
Wong

(10) Patent No.: US 11,357,344 B2
(45) Date of Patent: Jun. 14, 2022

(54) FLORAL ARRANGING APPARATUS

(71) Applicant: FLORA GUPPY HOLDINGS INC., Edmonton (CA)

(72) Inventor: James Wong, Edmonton (CA)

( * ) Notice: Subject to any disclaimer, the term of this patent is extended or adjusted under 35 U.S.C. 154(b) by 276 days.

(21) Appl. No.: 16/077,314

(22) PCT Filed: Oct. 20, 2017

(86) PCT No.: PCT/CA2017/051263
§ 371 (c)(1),
(2) Date: Aug. 10, 2018

(87) PCT Pub. No.: WO2018/072041
PCT Pub. Date: Apr. 26, 2018

(65) Prior Publication Data
US 2021/0219750 A1 Jul. 22, 2021

(30) Foreign Application Priority Data
Oct. 20, 2016 (WO) ................ PCT/CA2016/051219

(51) Int. Cl.
*A47G 7/07* (2006.01)
(52) U.S. Cl.
CPC ..................... *A47G 7/07* (2013.01)
(58) Field of Classification Search
CPC ............... A47G 7/00; A47G 7/06; A01G 5/00
USPC ............................................. 47/41.01–41.15
See application file for complete search history.

(56) References Cited

U.S. PATENT DOCUMENTS

| | | | |
|---|---|---|---|
| 3,447,262 A | 6/1969 | Uhl | |
| 3,605,324 A | 9/1971 | Adams | |
| 3,630,811 A | 12/1971 | Radus | |
| 3,768,202 A * | 10/1973 | Wheelock | ................ A01G 5/04 |
| | | | 47/41.13 |
| 3,889,950 A | 6/1975 | Kasravi | |
| 4,958,461 A | 9/1990 | Aldrich | |
| 4,964,237 A | 10/1990 | Specht | |
| 5,088,216 A * | 2/1992 | Wasilko | ................... A47G 7/06 |
| | | | 206/423 |
| 5,127,184 A | 7/1992 | Cosentino | |
| 5,142,820 A | 9/1992 | Aquino | |

(Continued)

FOREIGN PATENT DOCUMENTS

| | | |
|---|---|---|
| CN | 201557857 | 8/2010 |
| CN | 201905598 | 7/2011 |

(Continued)

*Primary Examiner* — Andrea M Valenti
(74) *Attorney, Agent, or Firm* — Richard D. Okimaw

(57) ABSTRACT

An apparatus for positioning flowers within a vase comprises a first hollow hemispherical shell extending to a first hemispherical edge having a plurality of apertures extending therethrough, the shell formed of a plurality of members extending between each of the apertures having a smooth substantially circular cross section and a second hollow hemispherical shell extending to a second hemispherical edge having a plurality of apertures extending therethrough, the shell formed of a plurality of members extending between each of the apertures having a smooth substantially circular cross section. The first and second hollow hemispherical shells are matable to each other along a parting line formed by connecting the first and second hemispherical edges.

7 Claims, 10 Drawing Sheets

(56) References Cited

U.S. PATENT DOCUMENTS

| | | | |
|---|---|---|---|
| 5,224,959 A | 7/1993 | Kasper | |
| 5,236,196 A | 8/1993 | Blankenburg | |
| 5,375,370 A | 12/1994 | Zimmerman | |
| D359,327 S | 6/1995 | Gould | |
| 5,477,637 A | 12/1995 | Aldrich | |
| 5,683,762 A | 11/1997 | Banschick | |
| 5,758,452 A | 6/1998 | Matteucci | |
| 5,853,827 A | 12/1998 | Wise | |
| 5,891,533 A | 4/1999 | Pensero | |
| 6,004,635 A | 12/1999 | Li | |
| 6,061,953 A | 5/2000 | Chubb | |
| 6,189,261 B1 | 2/2001 | Helgeson | |
| 6,237,882 B1 | 5/2001 | Dimuzio | |
| 6,418,673 B1 | 7/2002 | Flowerday | |
| 6,523,301 B2 | 2/2003 | Delaney | |
| 6,632,150 B1 * | 10/2003 | Ogg | A63B 37/0004 473/378 |
| 6,694,671 B2 | 2/2004 | Vahrmeyer | |
| D489,494 S * | 5/2004 | Silverglate | D21/713 |
| 6,729,984 B2 * | 5/2004 | Silverglate | A63B 43/00 273/157 R |
| D514,263 S * | 1/2006 | Willinger | D21/713 |
| 7,000,347 B2 | 2/2006 | Roskin | |
| 7,165,356 B1 | 1/2007 | Broel | |
| 7,263,800 B2 | 9/2007 | Taddeo | |
| D563,609 S | 3/2008 | Gick | |
| D564,938 S | 3/2008 | Schissler | |
| 7,406,798 B2 | 8/2008 | Barett | |
| D582,035 S * | 12/2008 | Morrison | D24/106 |
| 7,526,893 B2 | 5/2009 | Thoele | |
| D596,248 S | 7/2009 | Silvergate | |
| 7,707,769 B1 | 5/2010 | Courter | |
| 8,042,812 B2 | 10/2011 | Gao | |
| 8,069,609 B1 | 12/2011 | Towne | |
| D657,159 S | 4/2012 | Rosaen | |
| 8,166,703 B2 | 5/2012 | Driscoll | |
| 9,033,326 B1 | 5/2015 | Smith | |
| 9,861,218 B1 | 1/2018 | Matula | |
| 2001/0034972 A1 | 11/2001 | Masters | |
| 2003/0089033 A1 | 5/2003 | Wimp, Jr. | |
| 2004/0162171 A1 | 8/2004 | Silverglate | |
| 2005/0074728 A1 | 4/2005 | Dark | |
| 2005/0091917 A1 | 5/2005 | Brennan | |
| 2005/0150888 A1 | 7/2005 | Birkmeier | |
| 2006/0096170 A1 | 5/2006 | Wright | |
| 2006/0265951 A1 | 11/2006 | Foster | |
| 2007/0204511 A1 | 9/2007 | Lee et al. | |
| 2009/0307971 A1 | 12/2009 | Driscoll | |
| 2010/0095585 A1 * | 4/2010 | Hall | A47G 7/02 47/41.11 |
| 2010/0179593 A1 * | 7/2010 | Lamar | A61J 17/1111 606/236 |
| 2012/0028743 A1 | 2/2012 | Muldoon | |
| 2013/0053193 A1 * | 2/2013 | Lo | A63B 41/04 473/604 |
| 2014/0096489 A1 * | 4/2014 | Parry | D06F 95/002 53/467 |
| 2016/0051862 A1 | 2/2016 | Silverglate et al. | |
| 2016/0213174 A1 | 7/2016 | Kuchta | |
| 2018/0220590 A1 * | 8/2018 | Shaffer | A01G 5/04 |
| 2019/0059617 A1 | 2/2019 | Van Smirren | |

FOREIGN PATENT DOCUMENTS

| | | |
|---|---|---|
| CN | 203378324 | 1/2014 |
| CN | 206434122 | 8/2017 |
| CN | 108903528 | 11/2018 |
| CN | 201352910 | 12/2019 |
| EP | 782832 | 9/1977 |
| GB | 679403 | 9/1952 |
| JP | 0349717 | 3/1991 |
| JP | 0633571 | 5/1994 |
| JP | 08-299135 | * 11/1996 |
| JP | 2003210295 | 7/2003 |
| WO | 02091887 | 11/2002 |
| WO | 2005110167 | 11/2005 |
| WO | 2008089517 | 7/2008 |
| WO | 2008099172 | 8/2008 |
| WO | 2008101058 | 12/2009 |
| WO | 2013155275 | 10/2013 |

* cited by examiner

FLORAL ARRANGING APPARATUS

CROSS REFERENCE TO RELATED APPLICATION

This application is a national phase of PCT Patent Application Serial No. PCT/CA2017/051263 filed Oct. 20, 2017 entitled Floral Arranging Apparatus which in turn claims priority to PCT Patent Application Serial No. PCT/CA2016/051219 filed Oct. 20, 2016 also entitled Floral Arranging Apparatus.

BACKGROUND OF THE INVENTION

1. Field of Invention

The present invention relates generally to plant and floral arrangement aids, and in particular to a method and apparatus to position fresh and/or artificial flowers within a vase.

2. Description of Related Art

In the floral industry, florists cultivate, arrange and transport flowers for consumer purchase. In the art of flower arranging, the florist or hobbyist creates an aesthetic design in which to position live or artificial flowers, with the desire to maintain the design over time so that it may be enjoyed by viewers.

Flowers may be arranged within vases without floral arrangement aids, however, there are design concerns when aids are not used. One concern is that the arrangement may shift during transport to the customer. Over time, as flowers age, some flowers may wilt or need to be removed from the design, causing shifting within the container and diminishing the aesthetic beauty of the design. Additionally, it is periodically desirable to change the water within the vase to extend the life of the flowers. To change the water, the flowers often must be removed from then returned to their container. When the arrangement is removed from the container the individual flowers in the arrangement may shift and lose the original aesthetic design. Some users may avoid changing water due to concerns that the design will become disheveled by removal from the vase, and therefore the life of the flowers may be diminished.

Previous methods to improve the stability of a floral arrangement have been unsatisfactory. One such method is to tie the stems of the flowers together following arrangement. This method of stabilizing the arrangement can be difficult to master, as a great deal of skill is required to maintain the design with ties around the stems. In particular, the consumer may remove the ties before inserting the flowers into a vase, resulting in a loose arrangement with the challenges previously outlined above.

Floral foam has also been used to stabilize flower arrangement designs. A disadvantage of foam is that it breaks down if too many flowers are inserted into it, or if the flowers are required to be moved during design. Additionally, users may be reluctant to change the water in an arrangement using floral foam due to the difficulty of reinserting the foam and flowers to the same location.

Another method to stabilize floral designs is to use a structural apparatus which the flower stems may be passed through in order to facilitate arrangement and provide support for the flowers. One example of such an apparatus is described in International Patent Publication No. WO 2008/101058 A1 to Hall et al. A disadvantage with this design is that the holes through which the flower stems are passed are small, creating a challenge for the designer to pass each stem through both the top and stabilizing bottom holes of the apparatus in order to produce the desired design. Additionally, the majority of holes include square corners, which can scrape the flower stems, damaging them and releasing organic material into the water. Furthermore, this apparatus is constructed using a rigid plastic material, so that it is limited to be used within a vase which allows sufficient space for its size and shape.

SUMMARY OF THE INVENTION

According to a first embodiment of the present invention there is disclosed an apparatus for positioning flowers within a vase comprising a first hollow hemispherical shell extending to a first hemispherical edge having a plurality of apertures extending therethrough, the shell formed of a plurality of members extending between each of the apertures having a smooth substantially circular cross section and a second hollow hemispherical shell extending to a second hemispherical edge having a plurality of apertures extending therethrough, the shell formed of a plurality of members extending between each of the apertures having a smooth substantially circular cross section. The first and second hollow hemispherical shells are matable to each other along a parting line formed by connecting the first and second hemispherical edges.

The first and second hollow hemispherical shells may be substantially identical. The parting line may alternatingly pass to opposing sides of a equator of the apparatus around the periphery thereof. The connecting line may extend along a sinusoidal path. The connecting line may comprise alternating horizontal and angularly oriented portions.

Each of the first and second hemispherical edges may be formed of alternating horizontal and arcuate portions. The horizontal may be connected to each other such that the arcuate portions form opening therebetween.

The first and second hemispherical edges may each include a widened flange. One of the first or second hemispherical edges may include a plurality of taps extending therefrom adapted to be received within a plurality of notches in an other of the first or second hemispherical edge to couple the first and second hemispherical shells together.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
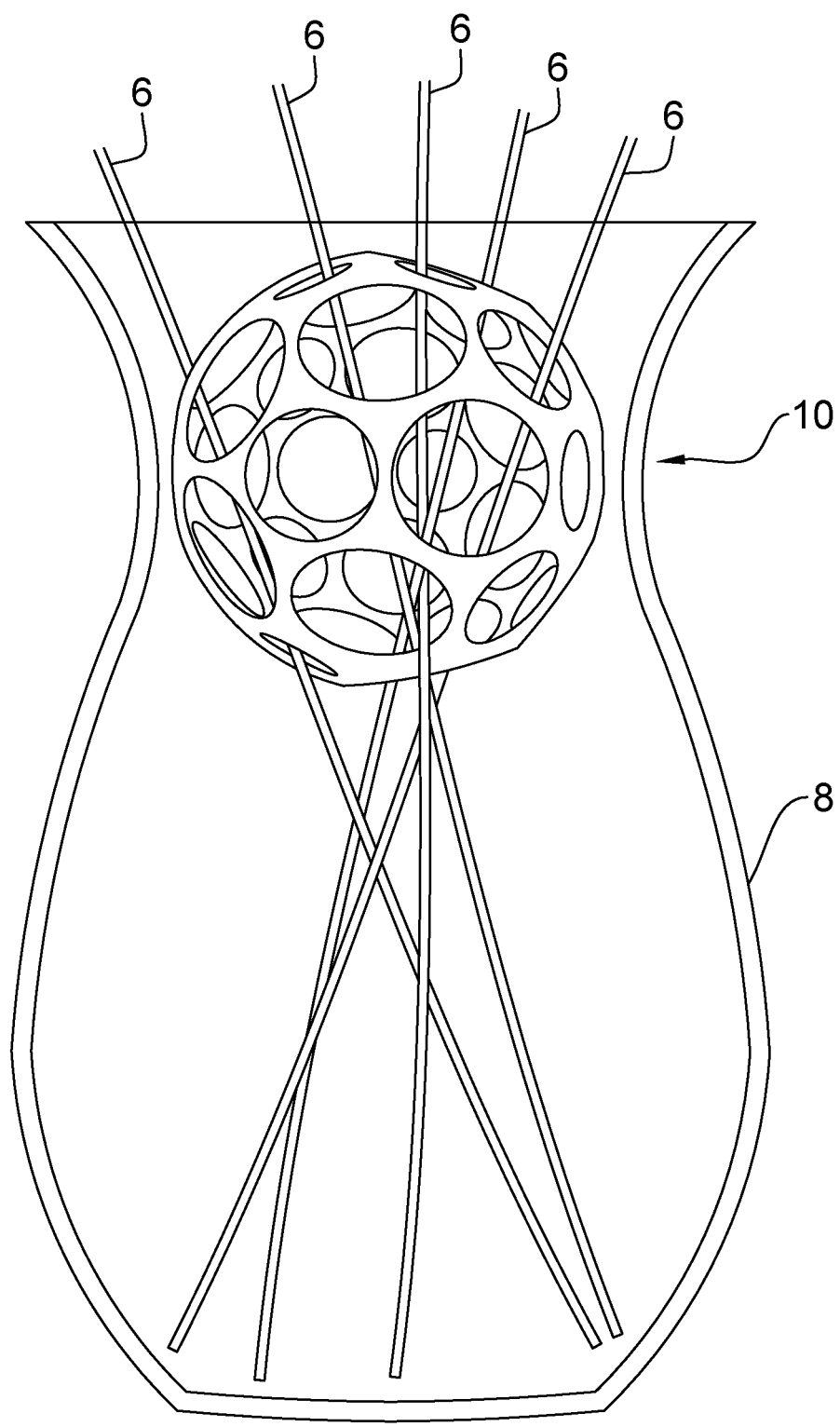
FIG. 1 is a side view of a vase and flower stems with a flower arranging apparatus according to a first embodiment of the present invention.

Referring to FIG. 1, an apparatus for providing enhanced support for floral arrangements according to a first embodiment of the invention is shown generally at 10, within a container or vase 8. A plurality of flower stems 6 extend through the apparatus 10 within a container 8 so as to position and arrange the flowers in the desired configuration.

Figure 2:
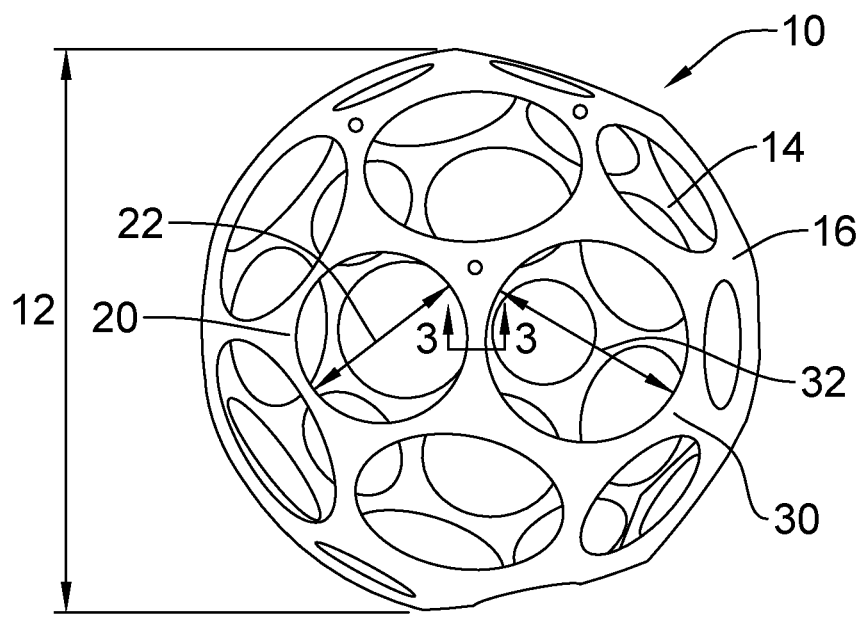
FIG. 2 is a perspective view of the apparatus of FIG. 1.

Referring to FIG. 2, the spherical apparatus 10 has an external diameter 12 and includes inner and outer mesh surfaces, 14 and 16, respectively, defining a plurality of small and large circular loop structures, 20 and 30, respectively. The external diameter 12 may be in the range of such as, by way of non-limiting example, 3¾ inch to 7¾ inch (95 mm to 200 mm), although it may be appreciated that other sizes may be useful, as well. The diameters of the openings are selected to pass the flower stems therethrough, such as between ½ and 2 inches (13 to 51 mm). In particular, the exterior diameter may be chosen to be slightly less than the interior diameter of the vase by a distance to prevent binding therein, such as, by way of non-limiting example, approximately ¼ to 1 inch (6 to 25 mm). Each small circular loop structure 20 may have an internal opening diameter 22 such as, by way of non-limiting example, ½ inch to 2 inches (13 mm to 50 mm). Furthermore, each large circular loop structure 30 may have an internal opening diameter 32 such as, by way of non-limiting example, 1 inch to 2 inches (25 mm to 50 mm). It will be appreciated that a user may cut through one or more small or large loop structures 20 or 30 to form larger openings when desired. The quantity of small and large circular loop structures, 20 and 30, may vary, dependent on the external diameter 12 of the apparatus 10. The circular loop structures, 20 and 30, may be preferentially aligned on opposite sides of the spherical apparatus 10, such that an object passing through one opening and directly through the centre of the apparatus 10 may pass through a second opening on the opposite side of the apparatus 10. Optionally only one or more than two sizes of openings may be used.

Figure 3:
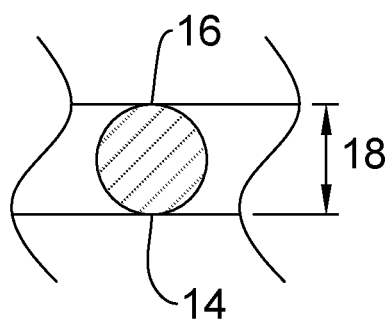
FIG. 3 is a cross sectional partial view of the apparatus of FIG. 1 through a wall between two loop openings as taken along the line 3-3 of FIG. 2.

Turning now to FIG. 3, a cross sectional view of the apparatus 10 between two loop openings is shown. As illustrated, the profile of the apparatus 10 between the inner and outer mesh surfaces, 14 and 16, is smoothly rounded, with a wall thickness 18, such as, by way of non-limiting example, in the range of ⅛ inch to 3/16 inch (3 mm to 5 mm). Advantageously, the loop structure of the apparatus 10 provides minimal surface area on which bacteria can grow.

Figure 4:
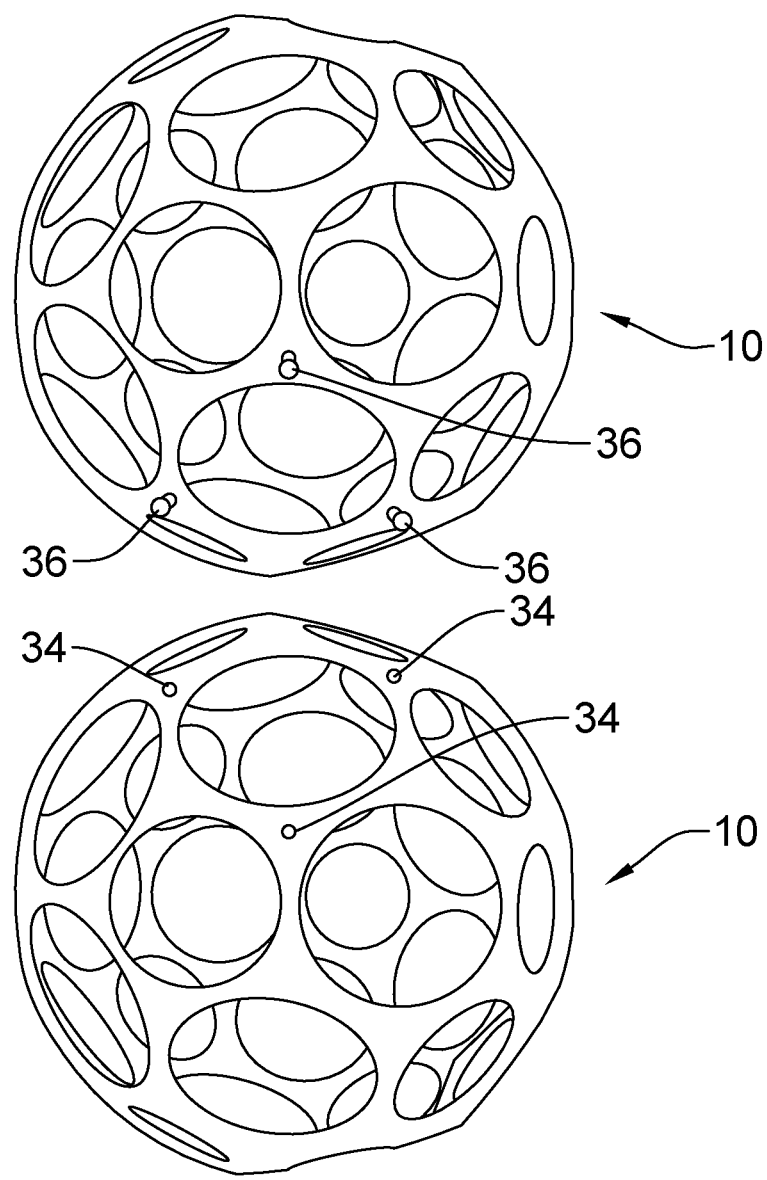
FIG. 4 is a perspective view of the apparatus of FIG. 1 with a second apparatus in a rotated view.

Referring to FIG. 4, two of the apparatus 10 are illustrated, with each apparatus 10 rotated to illustrate connectors thereon. The apparatus 10 includes a plurality of connectors, each comprised of a female connector portion 34 and a male connector portion 36. The female connector portion 34 is formed as a hole extending between the outer and inner surfaces, 16 and 14, of the apparatus 10, distributed around a circular loop structure, 20 or 30. The male connector portion 36 is formed as a cylindrical protrusion with a bulbous end extending from the outer surface 16 of the apparatus 10, distributed around a corresponding circular loop structure, 20 or 30, of an adjacent apparatus 10, such that a plurality of apparatuses 10 may be connected therewith. As illustrated, multiple apparatuses 10 may be utilized, although it will be appreciated that one or any other quantity may also be used.

The apparatus 10 may be constructed using a malleable material, such as, by way of non-limiting example, a polymer plastic, silicone or natural or synthetic rubber. Such malleable material will enable the apparatus 10 to be located within a range of vase shapes, such as, by way of non-limiting example, square, round or vases of a range of diameters by permitting the apparatus to deform to conform to the shape of the vase. The material may be infused with time release plant nutrients and/or an anti-bacterial agent. The material may also optionally be made of a biodegradable material. It will be appreciated that an infused or biodegradable material may be a single use product, although reusable materials may be useful, as well.

Figure 5:
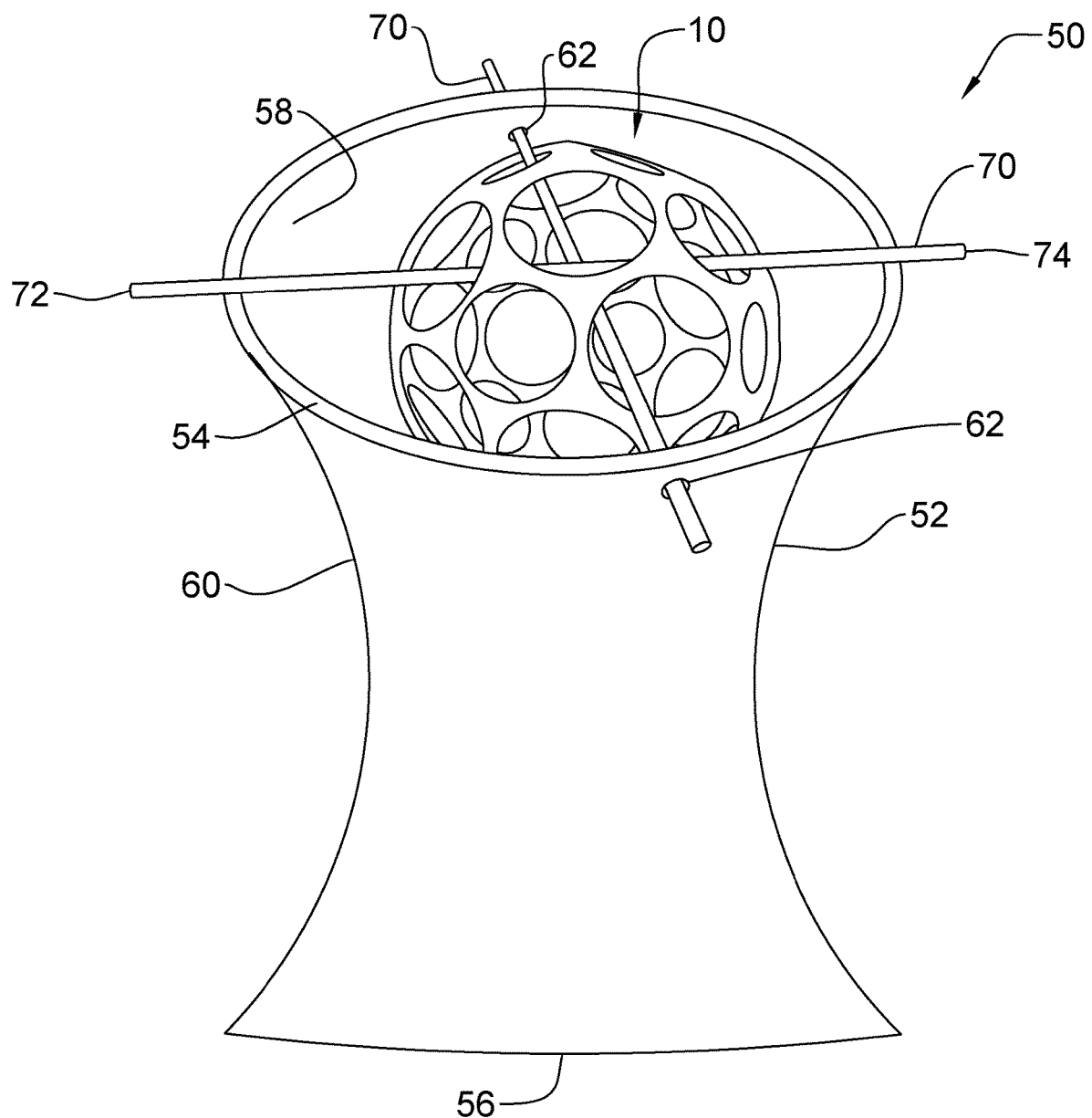
FIG. 5 is a perspective view of a system including the apparatus of FIG. 1 within a custom design container.

Referring now to FIG. 5, a system for arranging flowers supported by the apparatus 10 is generally illustrated at 50. The system 50 includes a container such as a vase 52, extending between top and bottom edges, 54 and 56, respectively, with a plurality of support rods 70. The container 52 is formed by a wall defined by inside and outside surfaces, 58 and 60, respectively, and includes a plurality of ports 62 therethrough, aligned radially therearound. Although the present embodiment of the invention illustrates two radially aligned ports 62, it may be appreciated that additional ports 62 may be useful, as well. Each support rod 70 extends between first and second ends, 72 and 74, respectively, and is sized to pass through one set of radially aligned ports 62, such that each end, 72 and 74, extends beyond the outside surface 60 of the container 52 when engaged within opposing radially aligned ports 62. As illustrated, one or more support rods 70 may also be rested on the top edge of the container 52.

To assemble the system 50 for use, a support rod 70 is passed through one port 62 from the outside surface 60 of the container 52. The apparatus 10 is aligned within the container such that the support rod 70 may pass through two circular loop structures, 20 and/or 30, as desired by the user, then through a second port 62 on the opposite side of the container 52 from the inside surface 58. This process is repeated for two or more support rods 70, as desired by the user. As a result, the apparatus 10 is positioned within the container 52 so that the user may proceed to create an aesthetic floral design therethrough. It may be appreciated that the support rods 70 may be used to support the apparatus 10 without the use of the ports 62, however the system will be less secure, and prone to movement during the flower arranging process.

To create an aesthetic floral arrangement using the system 50 illustrated in FIG. 5, a user extends a flower stem 6, as illustrated in FIG. 1, through two circular loop structures, 20 and/or 30, of the apparatus 10, passing from proximate to the top edge 54 towards the bottom edge 56 of the container 52 at any desired alignment. The user repeats this process with a plurality of flower stems 6, passing at various alignments through a plurality of pairs of circular loop structures, 20 and/or 30, until the desired result has been achieved. As more flower stems 6 are added to the arrangement, the available space within each circular loop structure, 20 and 30, will decreased, with the flower stems 6 forming a friction fit on the inside surface of the vase. When the flower arrangement is complete, the user may remove the plurality of support rods 70 through the ports 62 such that the apparatus 10 is no longer secured within the container 52 or may optionally leave the support rods 70 in place. With a plurality of flower stems 6 passing through the apparatus 10 and/or the support rods 70 at a plurality of alignments, the apparatus 10 will remained secured within the floral arrangement. The floral arrangement may be removed as a whole, with the apparatus 10, and placed in an alternate container, or wrapped for transport. The apparatus 10 ensures that the arrangement remains in the desired aesthetic design as the flower stems 6 are frictionally secured within the apparatus 10. Although flower stems 6 are described in the present embodiment of the invention, it may be appreciated that other decorative items, as are commonly known, may be included in the floral arrangement, as well. Once placed in a final display container 8, the flower arrangement, including the apparatus 10, may be removed and replaced in the container 8 for water changes without the risk of disheveling the floral design. Alternately, the flower arrangement, including the apparatus 10, may be moved to a new container 8 to adjust the overall aesthetics of the design.

As set out above, the apparatus 10 may be constructed using a malleable material. The apparatus 10 may be compressed and deformed to fit into containers of various sizes and shapes, such as, by way of non-limiting example, a cylindrical container with a diameter smaller than the external diameter 12 of the apparatus 10, or a flat rectangular container.

Figure 6:
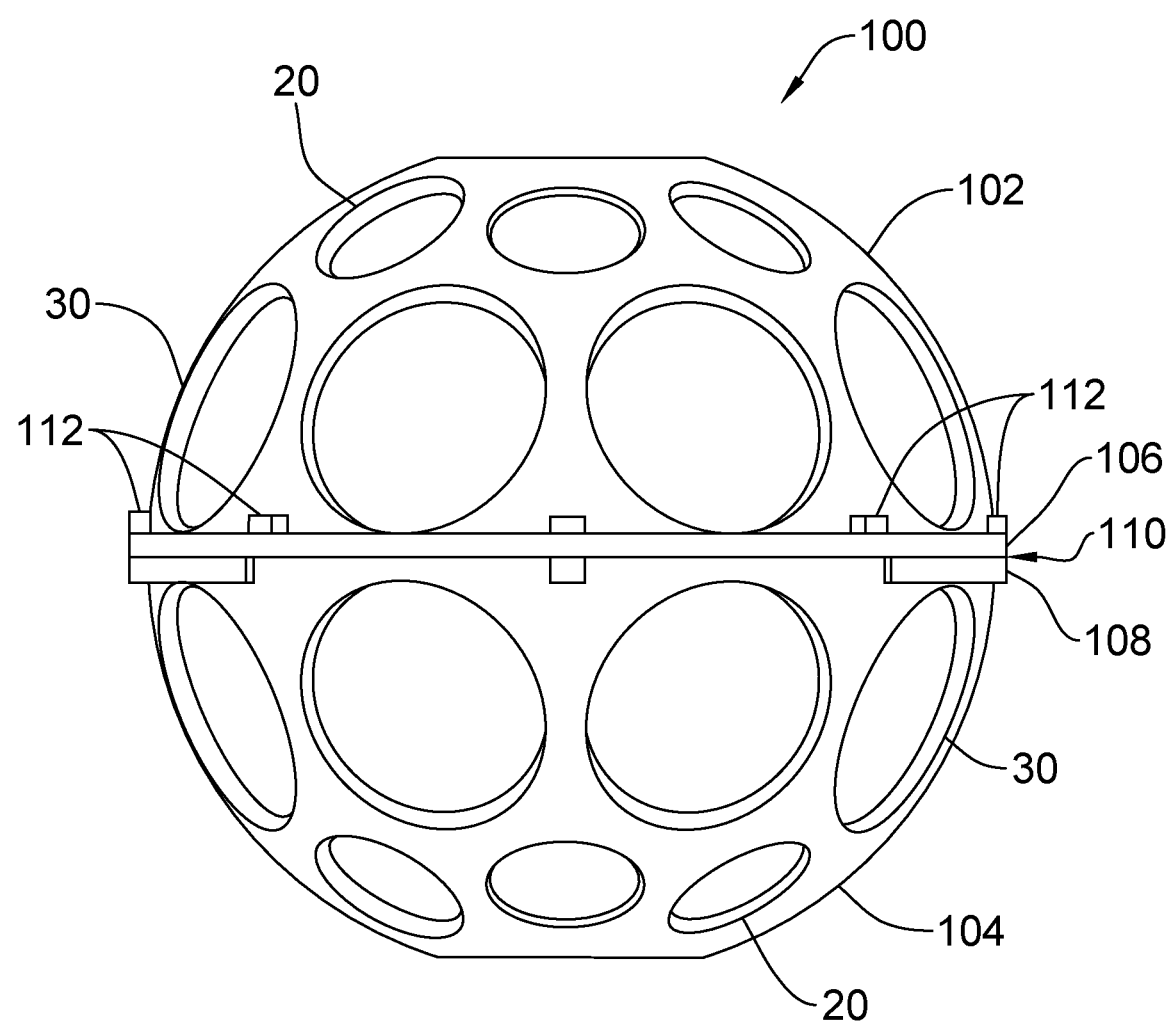
FIG. 6 is a side view of an apparatus for arranging flower stems according to a further embodiment of the present invention.
Figure 7:
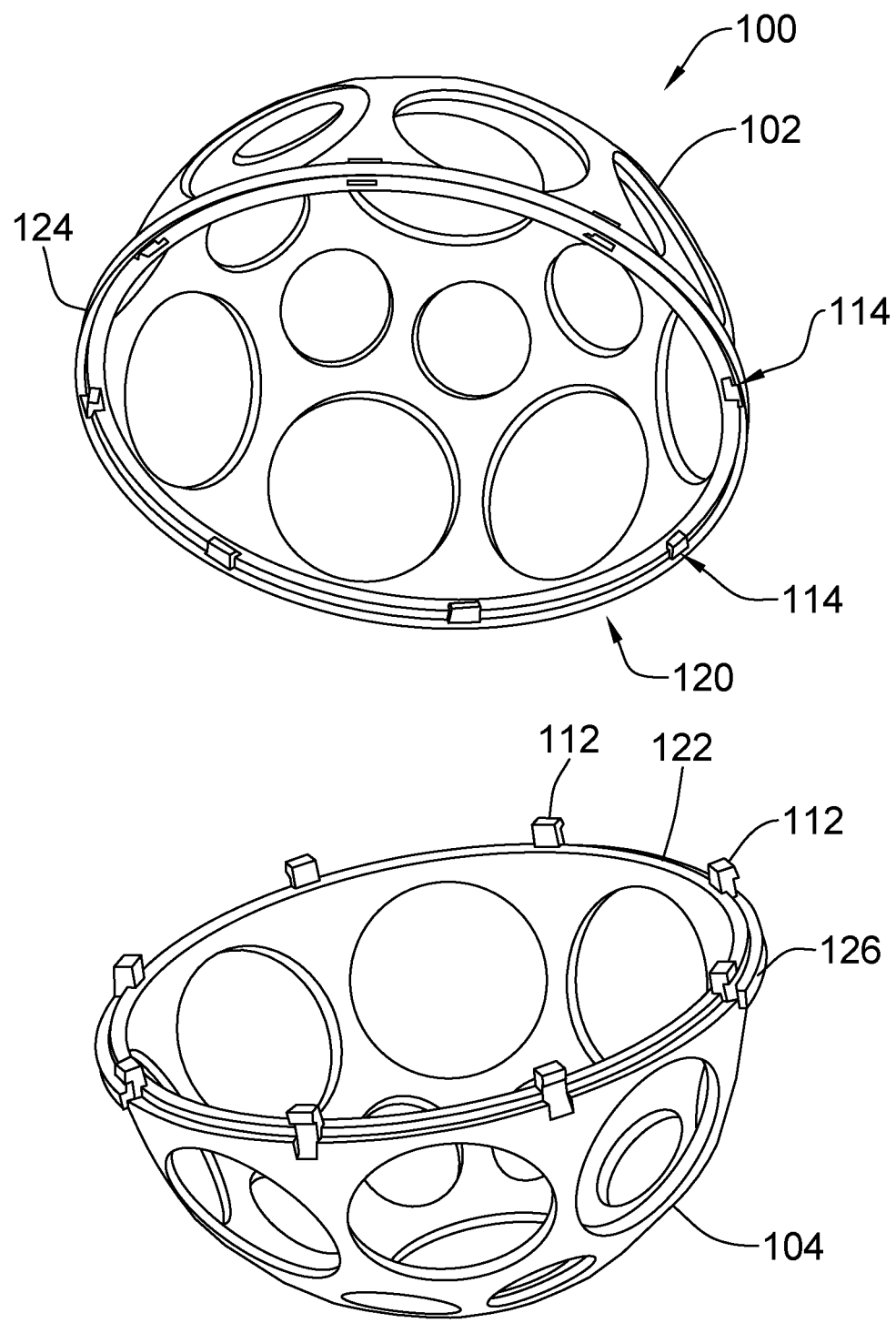
FIG. 7 is an exploded perspective view of the apparatus of FIG. 6

Turning now to FIG. 6 an apparatus 100 for providing enhanced support for floral arrangements is illustrated. As illustrated in FIGS. 6 and 7, the apparatus 100 is formed of first and second hemispheres, 102 and 104, respectively adapted to be connected to each other along a connecting line 110. Each hemisphere 102 and 104 extends to a hemisphere edge, 120 and 122, respectively. As further illustrated each hemisphere 102 and 104 may include a widened flange 124 and 126 adjacent to the hemisphere edge 120 and 122 so as to provide an enlarged surface area for joining each half to each other.

As illustrated in FIGS. 6 and 7, the first hemisphere 102 may include a plurality of apertures 114 passing through the flange 124 thereof adapted to receive a plurality of tabs 112 extending from the end of the second hemisphere edge 120. It will be appreciated that the notches 112 are retained within the apertures 114, as is commonly known to retain the two hemispheres 102 and 104 together. Alternatively adhesives or other welding and fusing techniques may also be employed to join the two hemispheres.

Figure 8:
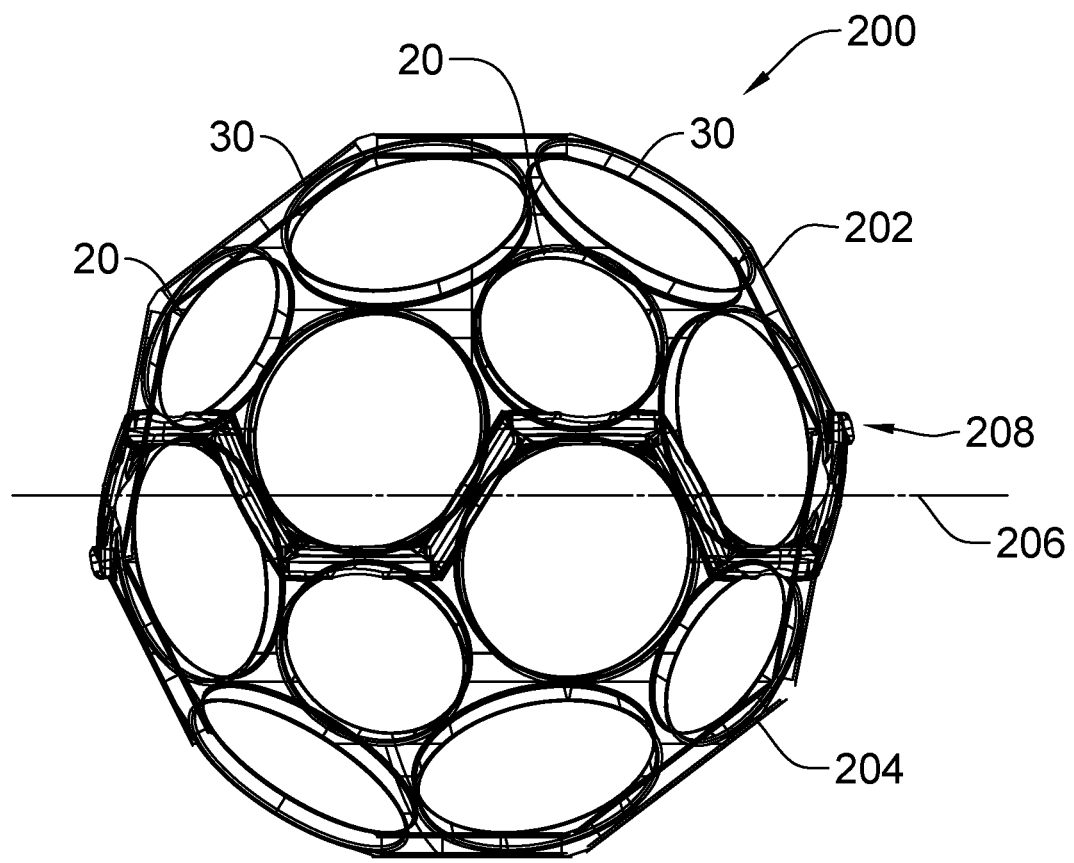
FIG. 8 is a side view of an apparatus for arranging flower stems according to a further embodiment of the present invention.
Figure 9:
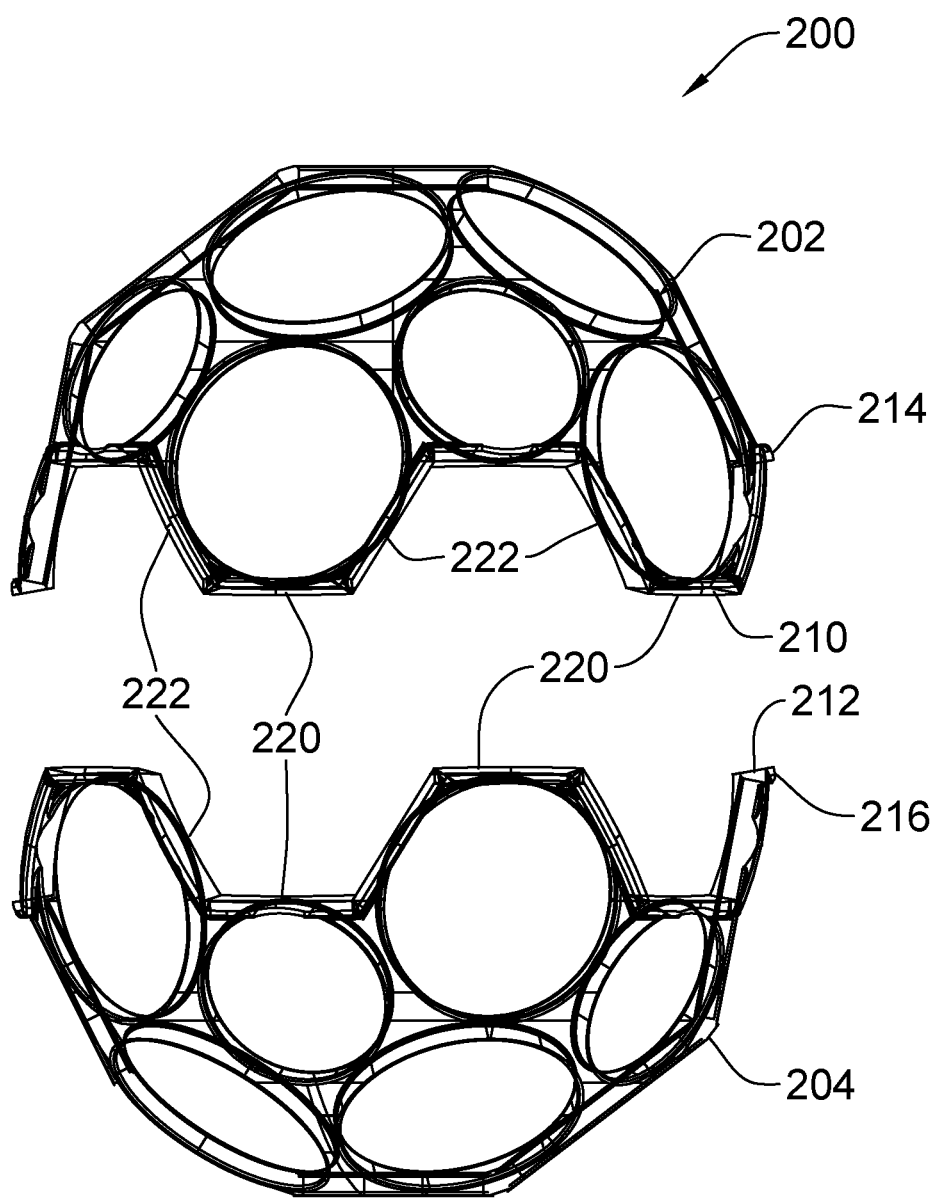
FIG. 9 is an exploded side view of the apparatus of FIG. 8

Turning now to FIGS. 8 and 9, an alternative embodiment of the apparatus 200 may be formed of first and second hemispheres 202 and 204 having a connection line 208 alternatingly crossing an equator 206 of the apparatus to either side thereof. As illustrated in FIGS. 8 and 9, the connection line 208 is formed by connecting the edges 210 and 212, respectively of the first and second hemispheres 202 and 204. As set out above, each edge may include a widened flange 214 and 216 adapted to enhance the connection between the first and second hemispheres as well as to provide an enlarged diameter to the apparatus to engage upon the interior surface of a vase.

Figure 10:
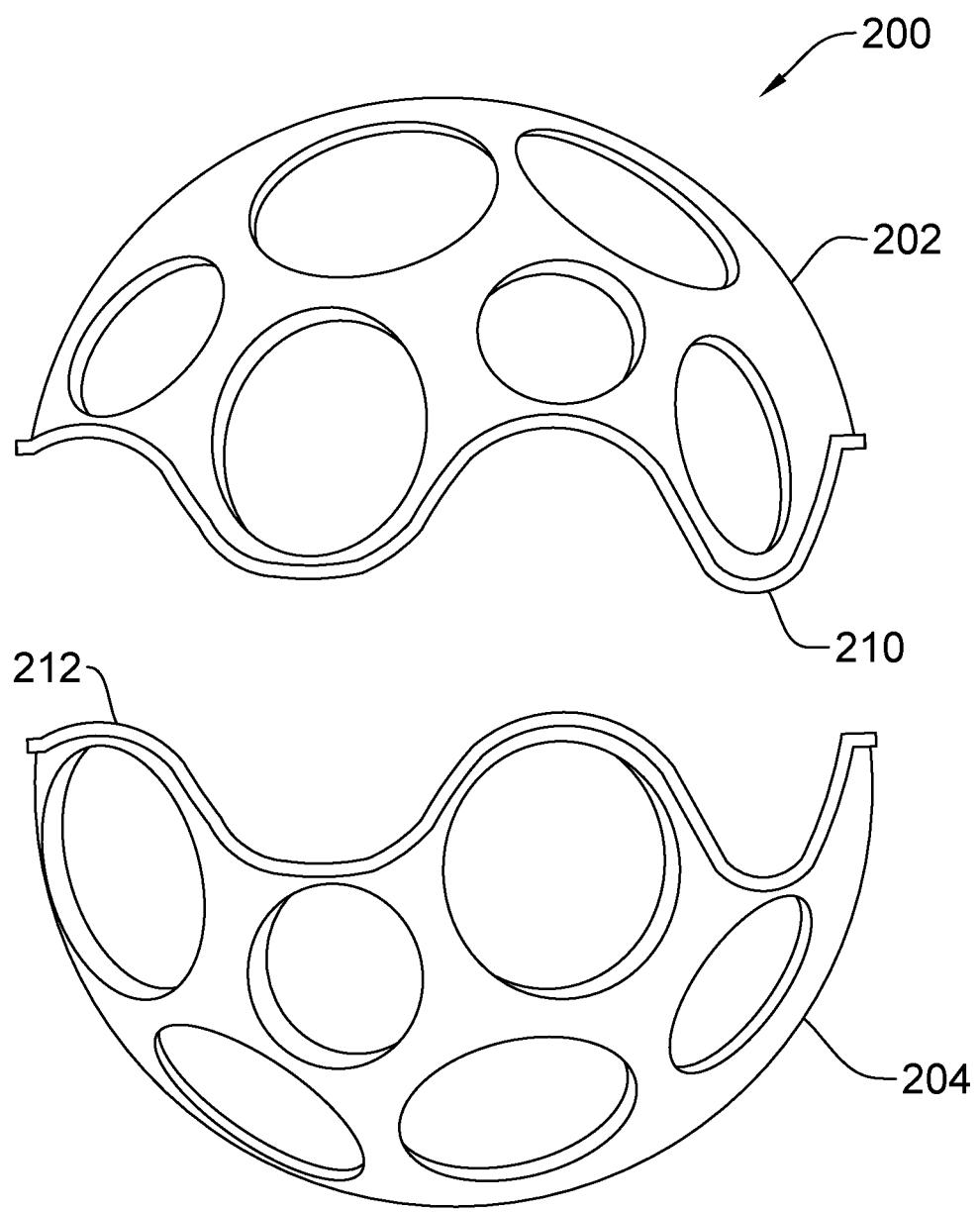
FIG. 10 is an exploded side view an apparatus for arranging flower stems according to a further embodiment of the present invention.

As illustrated in FIG. 9, the first and second edges may be formed of alternating horizontal and angular portions 220 and 222, respectively which correspond to each other so as to line up with each other and be adapted to be secured to each other when the first and second hemispheres are pressed together. Alternatively, the edges 210 and 212 may be formed as continuously wavy lines alternating to either side of the equator as illustrated in FIG. 10.

Figure 11:
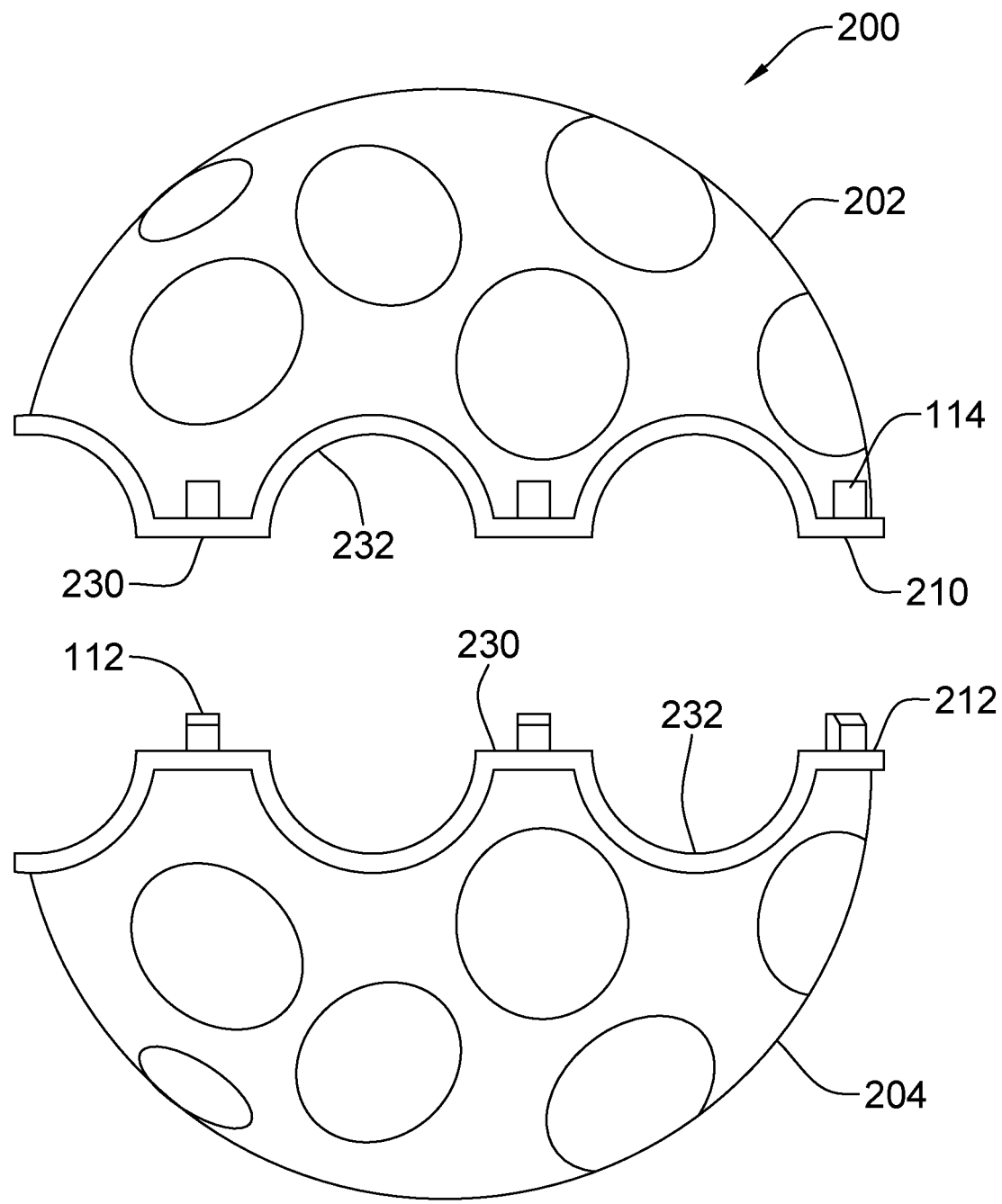
FIG. 11 is an exploded side view an apparatus for arranging flower stems according to a further embodiment of the present invention.

Turning now to FIG. 11, the edges 210 and 212 may be formed of alternating horizontal and arcuate portions, 230 and 232 respectively wherein the horizontal portions 230 are connected to each other such that the arcuate portions 232 form openings therebetween. The openings formed by the arcuate portions may be circular, elliptical or any other shape as desired. The horizontal portions may be connected to each other through any means such as tabs 112 and apertures 114, adhesives or the like.

The apparatus 10 or 200 may support the flowers at a position within the vase by engaging upon the inside wall of the vase such that the bottom tips of the stems do not reach the bottom of the vase. It will be appreciated that this will assist in preventing damage to the flower stems. In particular the flange 124 and 126 may be sized to engage upon and frictionally retain the apparatus within the vase.

While specific embodiments of the invention have been described and illustrated, such embodiments should be considered illustrative of the invention only and not as limiting the invention as construed in accordance with the accompanying claims.

What is claimed is:

1. An apparatus for positioning flowers within a vase comprising:
    a first hollow hemispherical shell extending to a first hemispherical edge and having a plurality of apertures extending therethrough, said first hemispherical edge comprising alternating horizontal and arcuate portions;
    a second hollow hemispherical shell extending to a second hemispherical edge and having a plurality of apertures extending therethrough, said second hemispherical edge comprising alternating horizontal and arcuate portions;
    a plurality of selectably releasable connectors extending from said horizontal portions of one of said first or second shells operable to selectably engage cooperating horizontal portions of an other of said first or second shells so as to releasable connect said first and second shells together so as to form a body sized to be located within a flower containing vessel,
    wherein said arcuate portions cooperate to define apertures between said connected hemispherical shells,
    wherein said first and second shells are formed of a plurality of members extending between each of said apertures having a smooth substantially circular cross section,
    wherein said apertures of said first and second and between said first and second hemispheres are free of corners and sized to pass the stem of at least one flower therethrough, and
    wherein a width of said horizontal connecting portions is selected to be shorter than a width of said arcuate portions such that said horizontal portions are capable of being passed through said apertures of an adjacent first or second hemispherical shell for connection together within said adjacent hemispherical shell.

2. The apparatus of claim 1 wherein said first and second hollow hemispherical shells are substantially identical.

3. The apparatus of claim 1 wherein said first and second hemispherical edges each include a widened flange.

4. The apparatus of claim 1 wherein said connectors comprise tabs adapted to be received within notches in said other of said first or second hemispherical shell.

5. The apparatus of claim 4 wherein said tabs extend from alternating horizontal portions with notches on interlocated horizontal portions.

6. The apparatus of claim 1 further comprising at least one stick adapted to be passed substantially horizontally through said body within said flower containing vessel.

7. The apparatus of claim 1 further comprising a first connector on one of said first or second hemispheres connectable to a second connector on an adjacent first or second hemisphere so as to form stacked bodies.

\* \* \* \* \*